US012658765B2

(12) United States Patent
Ledieu et al.

(10) Patent No.: US 12,658,765 B2
(45) Date of Patent: Jun. 16, 2026

(54) ELECTRIC MOTOR DESIGNED TO ALLOW BETTER REMOVAL OF THE HEAT GENERATED WHILE IT IS IN OPERATION

(71) Applicant: NOVARES FRANCE, Velizy-Villacoublay (FR)

(72) Inventors: Cédric Ledieu, Mont Saint Eloi (FR); Maxime Balligand, Harnes (FR)

(73) Assignee: NOVARES FRANCE, Velizy-Villacoublay (FR)

( * ) Notice: Subject to any disclaimer, the term of this patent is extended or adjusted under 35 U.S.C. 154(b) by 280 days.

(21) Appl. No.: 18/286,616

(22) PCT Filed: Apr. 7, 2022

(86) PCT No.: PCT/FR2022/050651

§ 371 (c)(1),
(2) Date: Oct. 12, 2023

(87) PCT Pub. No.: WO2022/219268

PCT Pub. Date: Oct. 20, 2022

(65) Prior Publication Data

US 2024/0388168 A1 Nov. 21, 2024

(30) Foreign Application Priority Data

Apr. 15, 2021 (FR) ...................................... 2103895

(51) Int. Cl.
| | |
|---|---|
| *H02K 9/197* | (2006.01) |
| *H02K 5/20* | (2006.01) |
| *H02K 15/021* | (2025.01) |

(52) U.S. Cl.
CPC ............... *H02K 9/197* (2013.01); *H02K 5/20* (2013.01); *H02K 15/021* (2025.01)

(58) Field of Classification Search
CPC ............ H02K 3/24; H02K 5/20; H02K 9/197; H02K 11/25
See application file for complete search history.

(56) References Cited

U.S. PATENT DOCUMENTS

| | | | |
|---|---|---|---|
| 2006/0108892 A1* | 5/2006 | Enos ........................ | H02K 9/06 310/260 |
| 2010/0045125 A1 | 2/2010 | Takenaka et al. | |

(Continued)

FOREIGN PATENT DOCUMENTS

| | | | |
|---|---|---|---|
| FR | 3049127 A1 * | 9/2017 | ............. H02K 9/193 |
| FR | 3093389 A1 | 9/2020 | |

(Continued)

OTHER PUBLICATIONS

FR3049127A1—Translation (Year: 2024).*

(Continued)

*Primary Examiner* — Christopher M Koehler
*Assistant Examiner* — Ahmed F Seck
(74) *Attorney, Agent, or Firm* — CANTOR COLBURN LLP

(57) ABSTRACT

The invention relates to an electric motor (10) comprising a rotor (11) mounted on a shaft (12), a stator (13) arranged around the motor (11), a front bearing (14) and a rear bearing (15) which are connected to one another, the front and rear bearings (14, 15) forming an internal cavity in which the rotor (11) and the stator (13) are housed, the electric motor (10) being cooled by a coolant circulating in the internal cavity in contact with winding overhangs (19) extending axially beyond two end faces (134, 135) of the stator (13), these respectively being the front end face (134) and a rear end face (135), the coolant entering the internal cavity via at least one fluid inlet duct (144) and exiting the internal cavity via at least one fluid outlet duct (145, 146), characterized in that the motor (10) further comprises two end plates (34, 35), (Continued)

these respectively being a front end plate (34) and a rear end plate (35), of annular shape and having a U-shaped cross section, the front end plate (34) and the rear end plate (35) respectively covering the winding overhangs (19) protruding beyond, respectively, the front end face (134) and rear end face (135) of the stator (13) and being configured to form, respectively, a front circulation tunnel and the rear circulation tunnel for the coolant, the front and rear circulation tunnels being in fluidic communication with the at least one fluid inlet duct (144) and the at least one fluid outlet duct (145, 146), and in that each of the end plates (34, 35) is fixed, preferably detachably, to the stator (13) by means of at least two assembly tabs (39) which are formed so that they project radially from an internal peripheral face of each of the end plates (34, 35), each of the assembly tabs (39) being configured to be inserted into an intermediary space between two adjacent winding overhangs (19).

18 Claims, 6 Drawing Sheets

(56)                    References Cited

U.S. PATENT DOCUMENTS

| | | | |
|---|---|---|---|
| 2012/0062056 A1 | 3/2012 | Bradfield | |
| 2019/0207457 A1* | 7/2019 | Hamiti | H02K 1/20 |
| 2020/0412183 A1 | 12/2020 | Bolotnikov et al. | |

FOREIGN PATENT DOCUMENTS

| | | | | |
|---|---|---|---|---|
| WO | WO-2012033679 A2 * | 3/2012 | | H02K 9/00 |
| WO | 2017194872 A1 | 11/2017 | | |

OTHER PUBLICATIONS

18286616_Aug. 29, 2025_WO_2012033679_A2_H.pdf (Year: 2025).*
International Search Report for corresponding application PCT/FR2022/050651 filed Apr. 7, 2022; Mail date May 30, 2022.

* cited by examiner

ELECTRIC MOTOR DESIGNED TO ALLOW BETTER REMOVAL OF THE HEAT GENERATED WHILE IT IS IN OPERATION

TECHNICAL FIELD

The disclosure concerns an electric motor arranged to allow better removal of the heat generated during its operation.

BACKGROUND

In general, the current electric motors include a rotor secured to a shaft and a stator which surrounds the rotor. The stator is mounted in a casing which includes bearings for the rotational mounting of the shaft. The rotor includes a body formed by a lamination bundle or polar wheels (claw pole) held in the form of a stack by means of a suitable fastening system. The body of the rotor includes inner cavities housing permanent magnets. The stator includes a body consisting of a lamination bundle forming a crown, whose internal face is provided with teeth delimiting two by two a plurality of slots open towards the inside of the stator body and intended to receive phase windings. These phase windings pass through the slots of the stator body and form winding heads projecting on either side of the stator body. The phase windings can for example consist of a plurality of U-shaped conductor segments, the free ends of two adjacent segments being connected together by welding.

In the rotor, the lamination stack is clamped axially between a front flange and a rear flange mounted coaxially with the shaft. Each flange has the overall shape of a disc extending in a radial plane perpendicular to the axis of the shaft. Each flange includes a central orifice for the coaxial mounting on the shaft and several through holes intended to receive fastening screws passing axially through the whole of the lamination stack, said screws being secured to the flanges by means of nuts. The front and rear flanges are generally formed of a non-magnetic, heat-conducting material, for example a metal.

The casing generally includes a front and rear bearings assembled together. The bearings define an inner cavity in which the rotor and stator are housed. Each of the bearings centrally carries a ball bearing for the rotational mounting of the rotor shaft.

During motor operation, the current flowing through the phase windings of the stator generates significant heat that must be removed. To cool the stator, there are currently several solutions. One of these solutions consists in providing a cooling circuit inside the bearing with which the stator is shrunk, a cooling liquid circulating inside the cooling circuit making it possible to remove the heat generated by the stator via the bearing. Nonetheless, this solution has the disadvantage of only allowing a cooling of the stator, by thermal conduction, at the level of the surfaces of the lamination stack which is in contact with the cooled bearing. This solution therefore does not allow optimum cooling of the motor. Another existing solution consists of circulating oil through the shaft of the rotor and then circulating this oil along the stator body by projection so that it is in contact with the winding heads of the phase windings of the stator. Such a solution, nonetheless, requires the provision of numerous modifications to the structure of the motor, which makes it difficult to implement, and therefore relatively expensive. Other solutions have also been described in documents WO 2017/194872 and FR 3 049 127.

The disclosure therefore aims to provide an electric motor arranged to allow better removal of the heat generated during its operation and does not have the draw backs of the existing solutions described above.

BRIEF SUMMARY

To this end, the disclosure concerns an electric motor comprising a rotor mounted on a shaft, a stator arranged around the rotor, a front bearing and a rear bearing connected to each other, said front and rear bearings forming an inner cavity in which are housed the rotor and the stator, the electric motor being cooled by a cooling fluid circulating in the inner cavity while being in contact with winding heads protruding axially from two end faces of the stator, respectively a front end face and a rear end face, said cooling fluid entering the inner cavity via at least one fluid inlet channel and exiting the inner cavity via at least one fluid outlet channel, characterized in that that the motor further comprises two covers, respectively a front cover and a rear cover, of annular shape, the front, respectively rear, cover covering the winding heads protruding from the front, respectively rear, end face of the stator and being configured to form a front, respectively rear, circulation tunnel for the cooling fluid, said front and rear circulation tunnels being in fluid communication with said at least one fluid inlet channel and said at least one fluid outlet channel, and in that each of the covers is fixed, preferably in a detachable manner, to the stator by means of at least two assembly tabs formed radially projecting from an inner peripheral face of each of the covers, each of said assembly tabs being configured to fit into an intermediate space between two circumferentially adjacent winding heads.

Thus configured, the electric motor can be cooled by a cooling fluid circulating inside the inner cavity defined by the front and rear bearings so as to be in contact with the stator, and in particular with the winding heads of the phase windings of the stator. A better removal of the heat generated by the motor during its operation can thus be obtained. Furthermore, because the cooling fluid circulates along circulation tunnels formed around the stator, an undesirable circulation of the cooling fluid inside the rotor is avoided. Finally, the disclosure also makes it possible to locally cool the lamination stack of the stator since the cooling fluid passes through the lamination stack over its entire length.

According to other characteristics, the motor of the disclosure includes one or more of the following optional characteristics considered alone or in combination:

- the assembly tabs are in the form of an inverted L whose length which is perpendicular to an axis defined by the rotor shaft is centered on said axis.
- each of the assembly tabs has a shape complementary to that of an intermediate space between two circumferentially adjacent winding heads.
- each of the front and rear covers is formed of an inner ring of cylindrical shape, arranged radially outside the winding heads, and an outer ring fixed to the inner ring, said outer ring having an annular rim arranged axially opposite to the winding heads and a cylindrical skirt arranged radially inside the winding heads.
- the inner and outer rings are connected together by clipping or gluing.
- the inner ring is provided with a fluid inlet opening, which is in fluid communication with said at least one fluid inlet channel.
- the inner ring is provided with a fluid outlet opening, onto which said at least one fluid outlet channel opens.

the inner ring is formed by assembling two or more parts connected together, the assembly of these parts being carried out when the inner ring is clipped onto the outer ring.

the outer ring is formed by assembling two or more parts connected together, the assembly of these parts being carried out when the inner ring is clipped onto the outer ring.

the outer diameter of the inner ring is slightly smaller than the outer diameter of the stator.

the inner diameter of the outer ring is slightly greater than the inner diameter of the stator.

said at least one fluid outlet channel comprises at least one outlet orifice formed radially through a cylindrical wall of one of the front or rear bearings adjoining an outer peripheral wall of the stator.

said at least one fluid inlet channel comprises at least one inlet orifice formed radially through a cylindrical wall of one of the front or rear bearings adjoining an outer peripheral wall of the stator, said at least one inlet orifice communicating fluidically with at least one fluid circulation channel formed inside the stator, said at least one fluid circulation channel opening at one of its ends into a front intermediate space axially separating the front bearing from the stator while being in fluid communication with the front circulation tunnel and at another of its ends in a rear intermediate space axially separating the rear bearing from the stator while being in fluid communication with the rear circulation tunnel.

one of the front or rear bearings is equipped on its outer periphery with at least one fluid inlet pipe communicating in a fluid manner with said at least one fluid inlet channel and/or with at least one fluid outlet pipe fluidly communicating with said at least one fluid outlet channel.

at least one of the assembly tabs incorporates a sensor, in particular of temperature.

the sensor is arranged on said at least one assembly tab so as to be positioned in contact with the stator, and, preferably, in contact with a conductor segment of the stator.

the cooling fluid is selected from air or an oil.

The disclosure also relates, according to a first embodiment, to a method for manufacturing a stator for an electric motor as defined above, comprising the following steps of:

providing a stator body forming a crown, whose inner face is provided with teeth delimiting two by two a plurality of slots open towards the inside of the stator body;

positioning a first inner ring on the end face of the stator body which adjoins the connecting parts of the conductor segments, said first inner ring having a cylindrical shape, being arranged radially outside the connecting parts, and being provided with assembly tabs formed radially projecting from an inner peripheral face of the first inner ring, each of said assembly tabs being intended to be inserted into an intermediate space between two adjacent conductor segments;

inserting a plurality of U-shaped conductor segments inside the slots of the stator body, each conductor segment comprising a pair of straight parts extending parallel to an axial direction defined by the stator body and a twisted-profile connecting part connecting said straight parts, each conductor segment, when inserted into the stator body, having two free ends protruding axially from the end face of the stator body which is opposite to that adjoining the connecting part, each of the assembly tabs of the first inner ring being inserted into an intermediate space between two adjacent conductor segments;

fixing a second inner ring on the end face of the stator body which adjoins the free ends of the conductor segments, said second inner ring having a cylindrical shape and being arranged radially outside the free ends, the fixing operating by means of assembly tabs radially formed projecting from an inner peripheral face of the second inner ring, each of said assembly tabs being inserted into an intermediate space between two adjacent conductor segments;

deforming the free ends of each conductor segment so as to come into contact with a free end of another conductor segment and securing, for example by welding, of the two free ends thus brought into contact so as to form connecting parts;

possible deposing a layer of electrically insulating material on the connecting parts initially present on the conductor segments;

possible deposing a layer of electrically insulating material on the connecting parts formed during the deformation and the securing of the free ends of the conductor segments;

fixing, in particular by clipping, a first outer ring on the first inner ring, said first outer ring having an annular rim arranged axially facing the connecting parts initially present on the conductor segments and a cylindrical skirt arranged radially to the interior of said connecting parts, the first inner and outer rings together forming a first circulation tunnel for a cooling fluid;

fixing, in particular by clipping, a second outer ring on the second inner ring, said second outer ring having an annular rim arranged axially facing the connecting parts formed during the deformation and the securing of the free ends of the conductor segments and a cylindrical skirt arranged radially inside said connecting parts, the second inner and outer rings together forming a second circulation tunnel for a cooling fluid.

The disclosure also relates, according to a second embodiment, to a method for manufacturing a stator for an electric motor as defined above, comprising the following steps of:

providing a stator body forming a crown, whose inner face is provided with teeth delimiting two by two a plurality of slots open towards the inside of the stator body;

inserting a plurality of U-shaped conductor segments inside the slots of the stator body, each conductor segment comprising a pair of straight parts extending parallel to an axial direction defined by the stator body and a twisted-profile connecting part connecting said straight parts, each conductor segment, when inserted into the stator body, having two free ends protruding axially from the end face of the stator body which is opposite to that adjoining the connecting part;

deforming the free ends of each conductor segment so as to come into contact with a free end of another conductor segment and securing, for example by welding, of the two free ends thus brought into contact so as to form connecting parts;

possible deposing a layer of electrically insulating material on the connecting parts initially present on the conductor segments;

possible deposing a layer of electrically insulating material on the connecting parts formed during the deformation and the securing of the free ends of the conductor segments;

fixing a first inner ring on the end face of the stator body which adjoins the connecting parts of the conductor segments initially present on the conductor segments, said first inner ring being formed of two or more parts, having a cylindrical shape and being disposed radially outside of said connecting parts, the fixing operating by means of assembly tabs formed radially projecting from an inner peripheral face of the first inner ring, each of said assembly fitting into an intermediate space between two adjacent conductor segments;

fixing, in particular by clipping, a first outer ring on the first inner ring, said first outer ring having an annular rim arranged axially facing the connecting parts initially present on the conductor segments and a cylindrical skirt arranged radially to the interior of said connecting parts, the first inner and outer rings together forming a first circulation tunnel for a cooling fluid;

fixing a second inner ring on the end face of the stator body which adjoins the connecting parts formed during the deformation and the securing of the free ends of the conductor segments, said second inner ring being formed of two or more parts, having a cylindrical shape and being arranged radially outside of said connecting parts, the fixing operating by means of assembly tabs formed radially projecting from an inner peripheral face of the second inner ring, each of said assembly tabs fitting in an intermediate space between two adjacent conductor segments;

fixing, in particular by clipping, a second outer ring on the second inner ring, said second outer ring having an annular rim arranged axially facing the connecting parts formed during the deformation and the securing of the free ends of the conductor segments and a cylindrical skirt arranged radially inside said connecting parts, the second inner and outer rings together forming a second circulation tunnel for a cooling fluid.

BRIEF DESCRIPTION OF THE DRAWINGS

The disclosure will be better understood on reading the non-limiting description which follows, made with reference to the appended figures.

DETAILED DESCRIPTION

Figure 1:
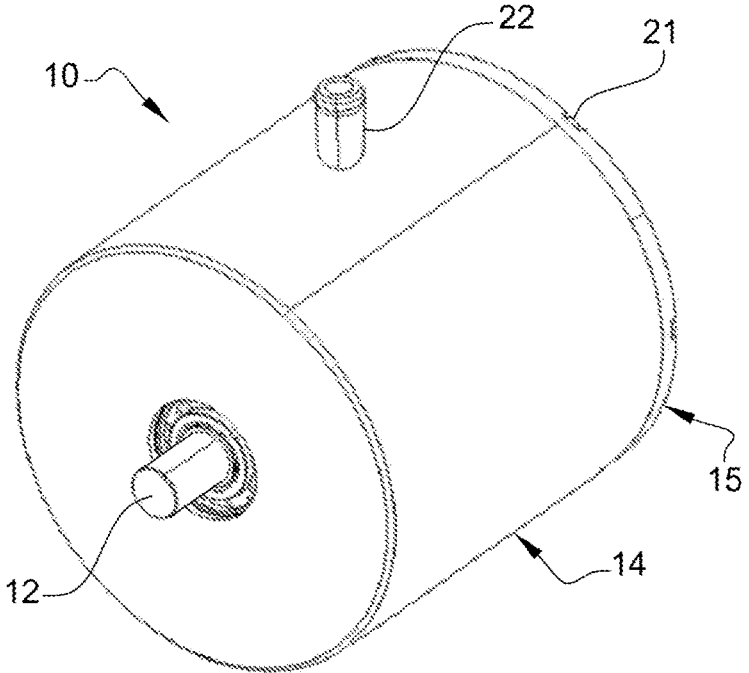
FIG. 1 is a perspective view of an electric motor according to a particular embodiment of the disclosure.
Figure 2:
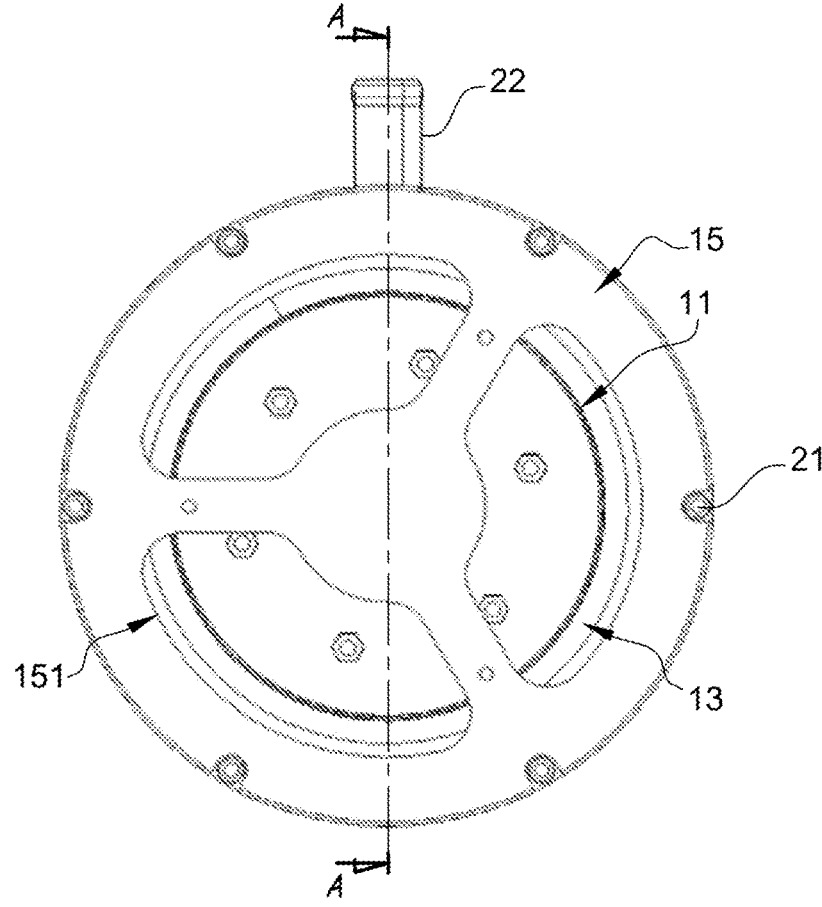
FIG. 2 is a rear view of the motor of FIG. 1.
Figure 3:
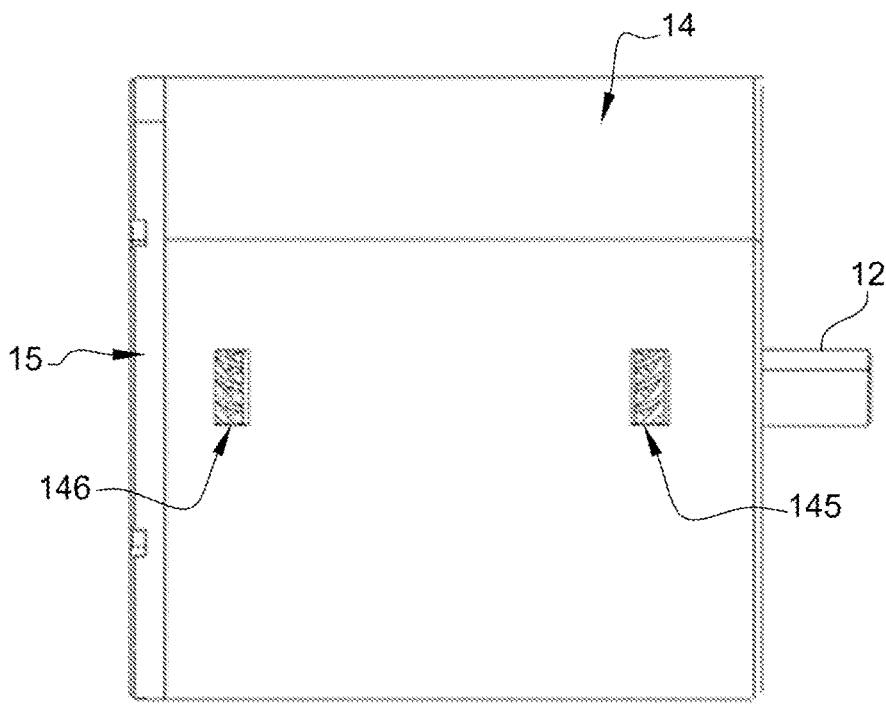
FIG. 3 is a bottom view of the motor of FIG. 1.

FIGS. 1 to 3 show an electric motor 10 according to the disclosure comprising two bearings, respectively a front bearing 14 and a rear bearing 15, connected together, in particular by means of screws 21, the front bearing 14 having a bell shape and the rear bearing 15 consisting of a perforated disc having several through openings 151.

Figure 10:
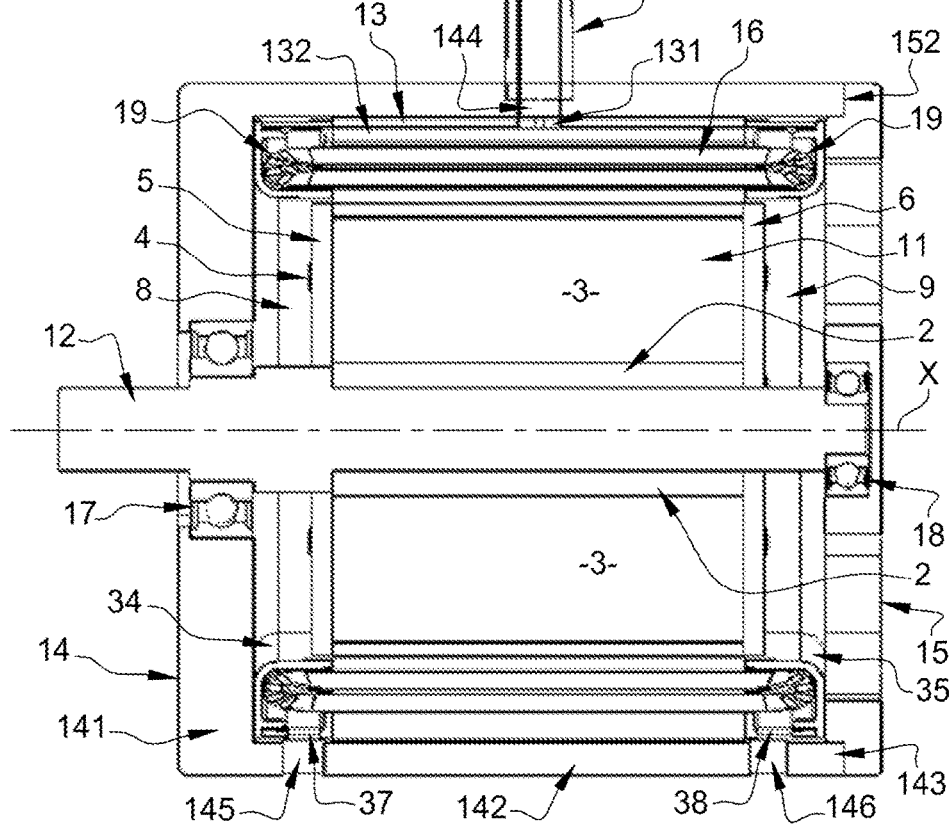
FIG. 10 is a sectional view of the motor of FIG. 2 along the section line AA.

As illustrated in FIG. 10, the front bearing 14 comprises a casing in which are housed a rotor 11 secured in rotation to a shaft 12 and an annular stator 13 which surrounds the rotor 11 coaxially with the shaft 12. The stator 13 will advantageously be shrunk inside the front bearing 14. The bearings 14, 15 form an inner cavity in which the rotor 11 and the stator 13 are housed. Each of the bearings 14, 15 centrally carries a ball bearing, respectively 17 and 18, for the rotational mounting of the shaft 12. Winding heads 19 protrude axially from either side of the stator body 13 and are housed in front and rear intermediate spaces 8, 9 axially separating the stator 13 from the bearings 14, 15 respectively. The front and rear bearings 14, 15 will advantageously be made of metal. In an advantageous configuration of the disclosure, the front bearing 14 will be made of aluminum, while the rear bearing 15 will be made of steel.

In the shown embodiment, the rotor 11 comprises a body formed by a lamination stack 2 made of a ferromagnetic material, in particular steel, as well as a plurality of permanent magnets 3 intended to be housed in a plurality of inner cavities formed inside the lamination stack 2, each inner cavity housing a permanent magnet 3. The lamination stack 2 is mounted coaxially on the shaft 12 rotatably mounted about an axis X. The shaft 12 can be force fitted inside a central opening of the lamination stack 2 so as to connect in rotation the body of the rotor with the shaft 12.

The lamination stack 2 is formed by an axial lamination bundle which extend in a radial plane perpendicular to the axis X of the shaft 12. A plurality of fastening holes are made in the lamination stack 2 to allow the passage of fastening screws 4 of the laminations of the stack. These fastening holes are through so that it is possible to pass a screw 4 inside each hole. A first end of the screws 4 bears against the outer face of a front end flange 5, while the other end of the screws 4 cooperates with a nut bearing against the outer face of a rear end flange 6. Thus, the lamination stack 2 is clamped axially between the front end flange 5 and the rear end flange 6. These flanges 5, 6 make it possible to ensure a balancing of the rotor 11 while allowing good maintenance of the magnets 3 inside their respective cavity. The shrinking can be done by adding or removing material. The removal of material can be carried out by machining, while the addition of material can be carried out by implanting elements in openings provided for this purpose and distributed along the circumference of the flanges 5, 6.

The front bearing 14 has a cylindrical part 142 which extends axially from an end wall 141 of the front bearing 14, said wall 141 having the shape of a disc aligned in a plane perpendicular to the axis X of the shaft 12. The front bearing 14 rests at an end edge 143 on a shoulder 152 defined by the rear bearing 15.

As illustrated in FIGS. 3 and 10, the front bearing 14 is provided, in its upper half, with a first through orifice 144 and, in its lower half, with two other through orifices 145, 146, said orifices 144-146 being formed radially through the cylindrical part 142 of the front bearing 14. The orifice 144 defines an inlet channel for a cooling fluid and the orifices 145, 146 define outlet channels for the cooling fluid. The fluid inlet orifice 144 opens, at one of its ends flush with the outer periphery of the cylindrical part 142, at the level of a fluid inlet pipe 22 and, at another end flush with the inner periphery of the cylindrical part 142, on a through hole 131 formed radially through the stator 13, said through hole 131 opening into a fluid circulation channel 132 formed axially inside the lamination stack 2 of the stator 13. This fluid circulation channel 132 opens at one of its ends into the front intermediate space 8 and at another end into the rear intermediate space 9. Thus, the cooling fluid can be supplied via the inlet pipe 32 and will circulate successively in the fluid inlet channel 144, then in the fluid circulation channel 132, by crossing the lamination stack 2 of the stator 13, to finally come into contact with the winding heads 19 of the stator.

Figure 4:
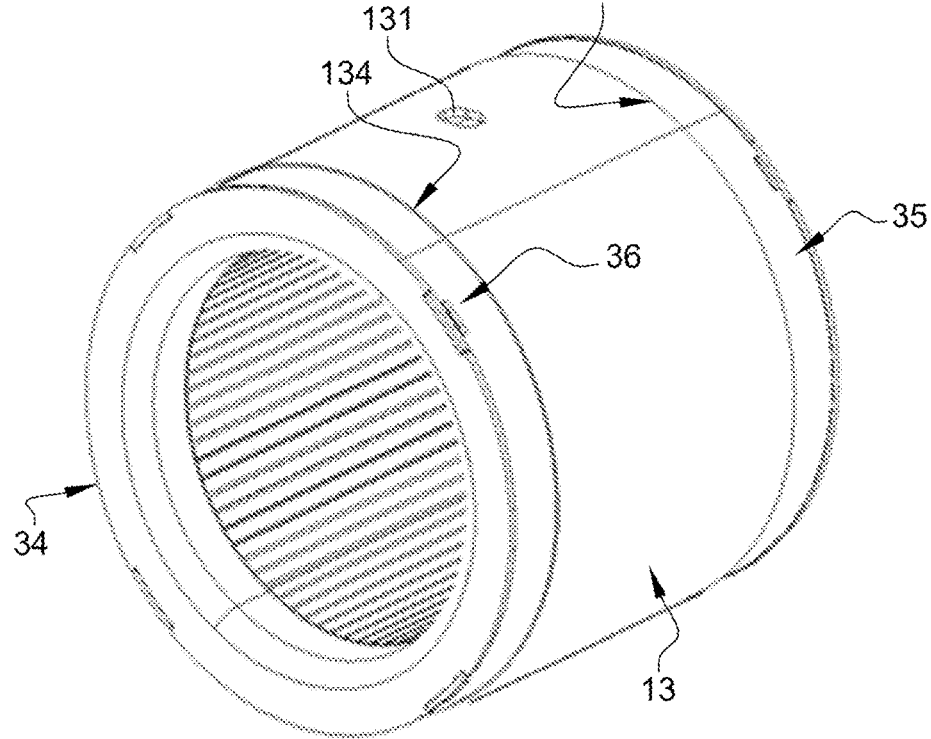
FIG. 4 is a perspective view of a stator provided with front and rear covers, with the stator seen from above.
Figure 5:
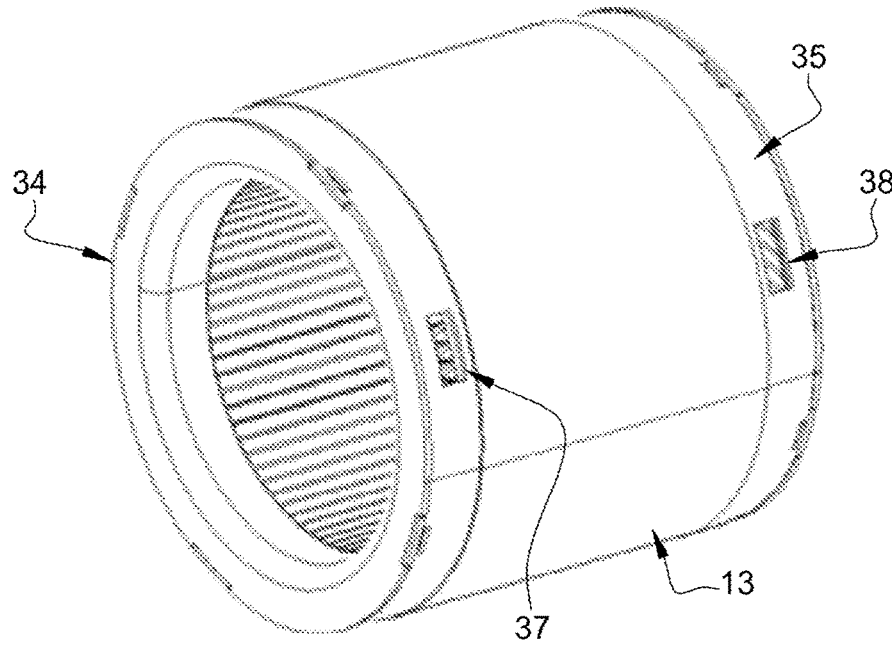
FIG. 5 is a view similar to FIG. 4, the stator being observed from below.

To prevent the cooling fluid from coming into contact with the rotor 11, and as shown in FIGS. 4, 5 and 10, the stator 13 is equipped with front 34 and rear 35 covers fixed respectively to the front 134 and rear 135 end faces of the stator 13. Each of the covers 34, 35 is of substantially annular shape and has a U-shaped cross-section. The front and rear covers 34, 35 are fixed respectively to the front and rear end faces 134, 135 of the stator 13 and thus cover the winding heads 19 protruding respectively from said front and rear end faces 134, 135, respectively forming front and rear circulation tunnels in which the cooling fluid can circulate. The covers 34, 35 are each provided with a fluid inlet opening 41 (see for example FIGS. 8 and 9) which is aligned axially with the fluid circulation channel 132 formed axially inside the lamination stack 2 of the stator 13. The cooling fluid supplied from the fluid inlet channel 144 can thus circulate inside the front and rear circulation tunnels. The covers 34, 35 are also each provided with outlet openings 37, 38 in their lower part, said outlet openings 37, 38 opening respectively on the orifices 145, 146 of the front bearing 14. Thus, after having been heated in contact with the winding heads 19 having circulated inside the front and rear circulation tunnels defined by the front and rear covers 34 and 35, the cooling fluid can exit the electric motor 10 via the outlet orifices 145, 146. In a variant (not shown), it will be possible to provide the front bearing 14 with at least one fluid outlet pipe into which the fluid outlet orifices 145, 146 will open. This fluid outlet pipe may supply a casing for receiving this fluid, this fluid, after cooling for example using a heat exchanger, being reinjected using a pump into the fluid inlet pipe 22.

Figure 6:
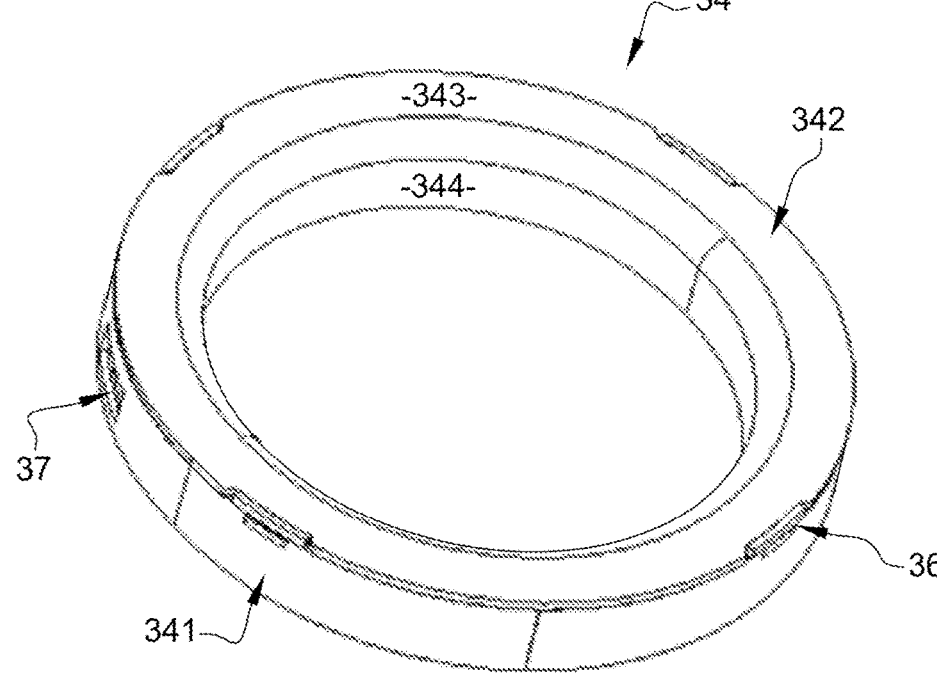
FIG. 6 is a perspective view of one of the covers shown in FIGS. 4 and 5.

Referring to FIG. 6, there is shown an advantageous embodiment of a front cover 34. It is clear that the rear cover 35 can also be made according to this advantageous embodiment. In this embodiment, the cover 34 consists of an inner ring 341 of cylindrical shape, which is arranged, in the mounted position of the motor, radially outside the winding heads 19, and an outer ring 342 removably fixed on the inner ring 341 by means of fastening clips 36. The outer ring 342 has in particular an annular rim 343, which is arranged, in the mounted position of the motor, axially facing the winding heads 19, and a cylindrical skirt 344, which is arranged, in the mounted position of the motor, radially inside the winding heads 19. Advantageously, the inner ring 341 will have an outer diameter which will be substantially equal to or slightly less than the outer diameter of the stator 13, so as to allow the shrinking of the stator 13 inside the front bearing 14. Moreover, the inner diameter of the outer ring 342, that is to say the inner diameter of the cylindrical skirt 344, will be substantially equal to or slightly greater than the diameter inside the stator 13, so as to facilitate the assembly of the rotor 11 inside the stator 13.

Figure 7A:
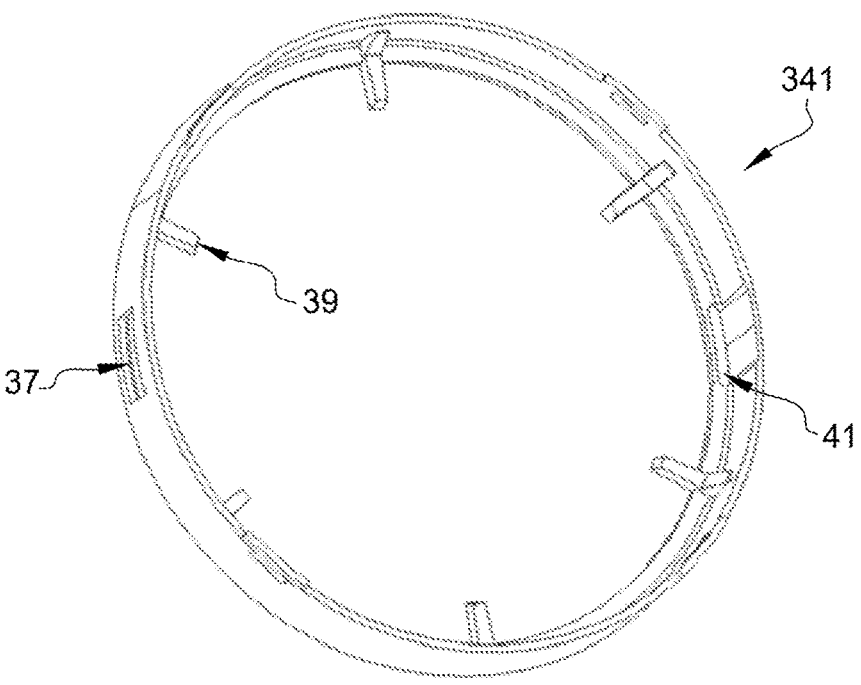
FIG. 7a is a perspective view of the inner ring of the cover shown in FIG. 6, according to a first embodiment.
Figure 8:
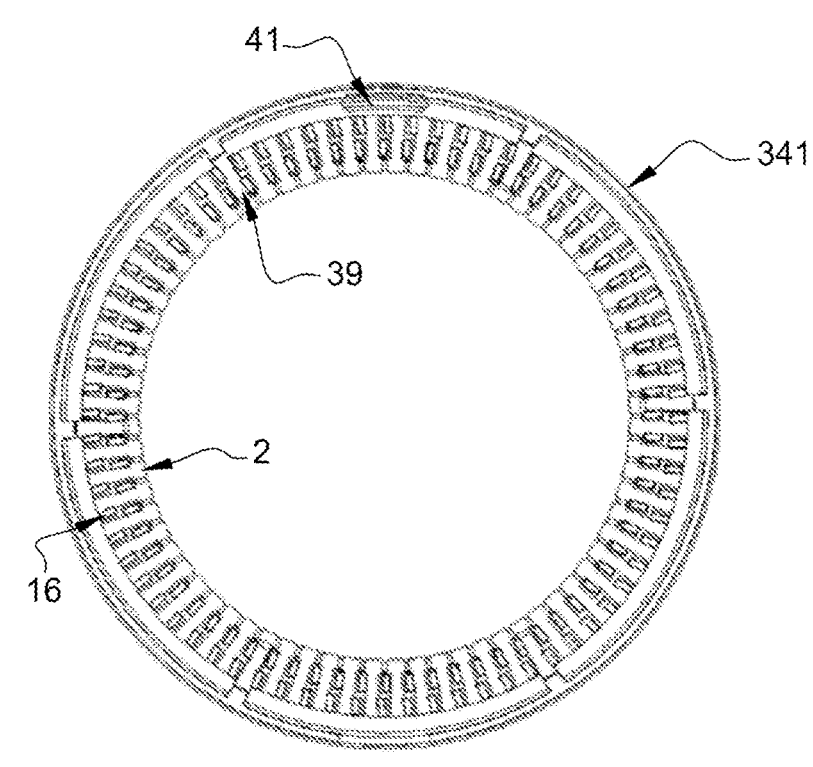
FIG. 8 is an axial view of the inner ring shown in FIG. 7a, in its assembled state with the stator.
Figure 9:
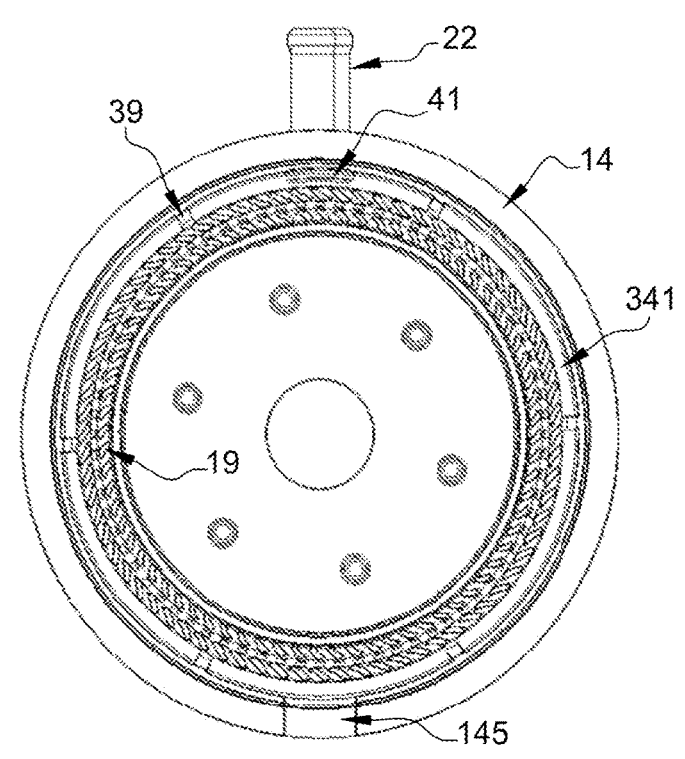
FIG. 9 is a rear axial view of the motor of FIG. 1, the rear bearing and the rotor shaft having been removed.

Referring to FIG. 7a, there is shown a first embodiment of the inner ring 341 of the cover 34 shown in FIG. 6. It is clear that the inner ring of the rear cover 35 can also be made according to this first embodiment. In this embodiment, the inner ring 341 is formed in one piece and comprises several assembly tabs 39 formed radially projecting from an inner peripheral face of the inner ring 341. The assembly tabs 39 are in the form of an inverted L whose length which is perpendicular to the axis X defined by the shaft 12 of the rotor is of substantially straight shape and is intended to be centered, in the mounted position of the motor, on the axis X defined by the shaft 12 of the rotor. As shown in FIG. 8, each assembly tab 39 is fitted into an intermediate space between two adjacent conductor segments 16. As detailed below; the front cover 34 can advantageously be fixed to the stator in two steps, respectively a first step, during which the inner ring 341 is fixed firstly to the stator 13, the conductor segments 16 protruding axially from the front end face 134 of the stator 13 being disjoint and not yet forming winding heads 19, and a second step, during which the outer ring 342 is fixed to the inner ring 341, in particular by clipping or gluing, the conductor segments 16 protruding axially from the front end face 134 of the stator 13 having been previously deformed and welded together so as to form the winding heads 19, as shown in FIG. 9.

Figure 7B:
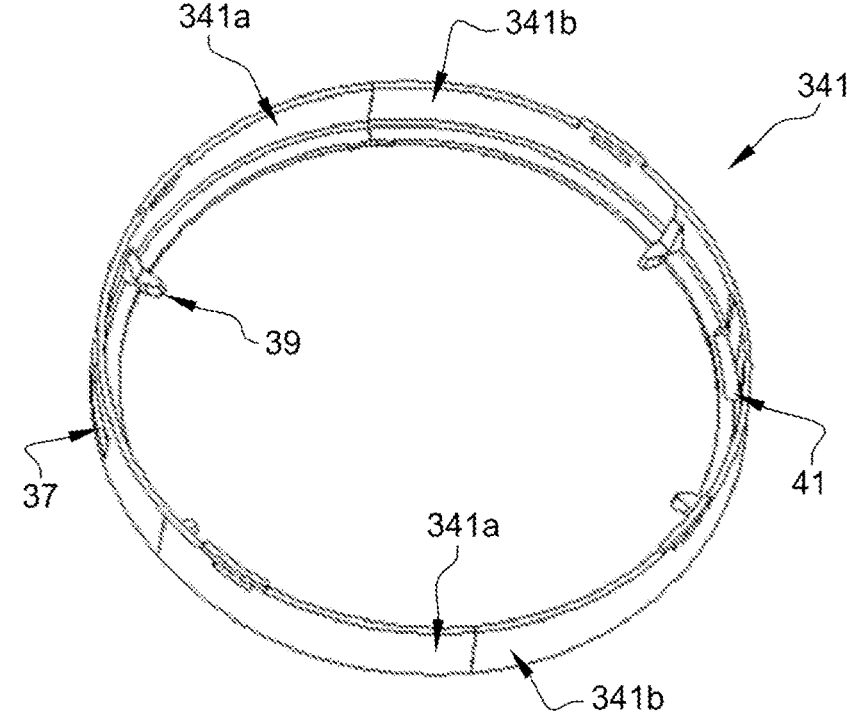
FIG. 7b is a perspective view of the inner ring of the cover shown in FIG. 6, according to a second embodiment.
Figure 7C:
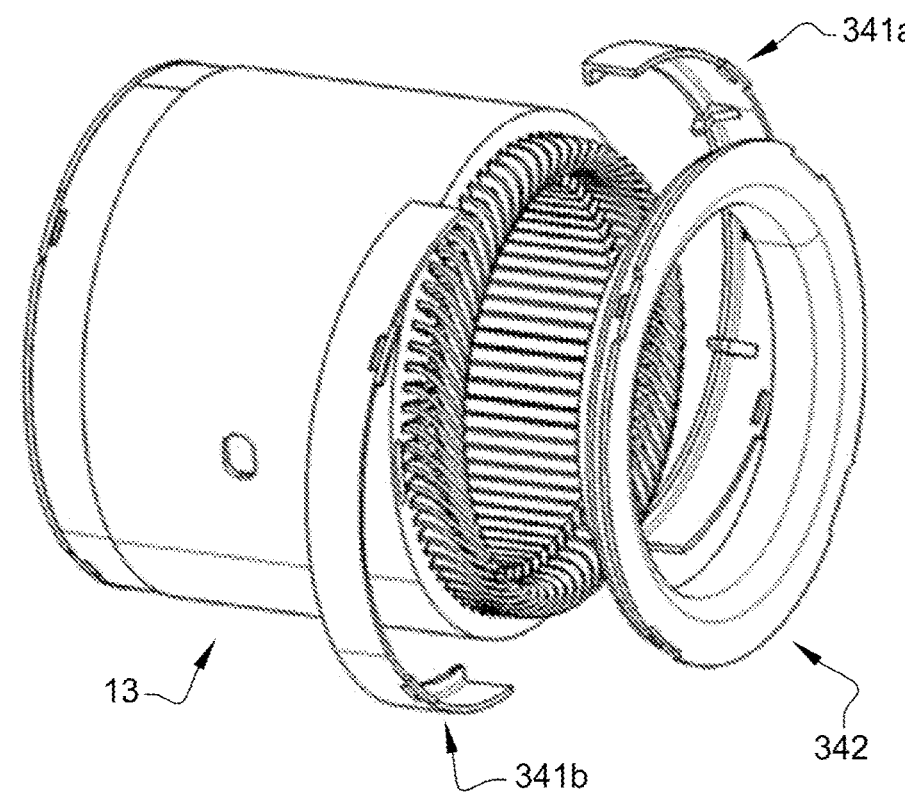
FIG. 7c is a perspective view of the inner ring shown in FIG. 7b when it is placed on the stator.

Referring to FIG. 7b, there is shown a second embodiment of the inner ring 341 of the cover 34 shown in FIG. 6. It is clear that the inner ring of the rear cover 35 can also be made according to this second embodiment. In this embodiment, the inner ring 341 is formed of two substantially symmetrical parts 341a, 341b, assembled together, for example by clipping the parts 341a. 341b onto the outer ring 342. Thus configured, the inner ring 341 can be assembled on the stator 13 once the stator is finished. Indeed, the insertion of the assembly tabs 39 inside the space between two conductor segments 16 will require less adjustment time than for the ring of FIG. 7a, due to the lower number of assembly tabs 39 on each of the parts 341a. 341b. Moreover, the inner ring 341 of FIG. 7b also has the advantage of being able to be fixed on a stator 13 in which the winding heads 19 are already formed as illustrated in FIG. 7c. To this end, the assembly tabs 39 are in the shape of an inverted L whose length which is perpendicular to the axis X defined by the shaft 12 of the rotor is in the shape of a point and is intended to be centered, in the raised position of the motor, on the axis X defined by the shaft 12 of the rotor. This length is advantageously shorter than that of the assembly tabs shown in FIG. 7a. In another embodiment (not shown), the assembly tabs 39 may have a shape complementary to that of an intermediate space between two adjacent winding heads. It will also be possible to make the inner ring 341 in several parts, the number of parts being greater than or equal to 3. In another embodiment (not shown) of the disclosure, the outer ring 342 may also be formed of two or more parts assembled together.

In an advantageous form of the disclosure, it will be possible to integrate one or more sensors, in particular of temperature, in one or more of the assembly tabs 39 of the inner ring 341. These sensors can be fixed on the assembly tabs 39 by gluing, clipping or overmoulding. These sensors will advantageously be arranged on the assembly tabs 39 so as to be in contact with one or more conductor segments 16. It will thus be possible to make precise measurements of physical parameters inside the stator 13, in particular to detect the temperature of the conductor segments 16.

According to a first embodiment, the stator 13 provided with the front and rear covers 34, 35 could for example be obtained by implementing the following successive operations:

a) providing a stator body forming a crown, whose inner face is provided with teeth delimiting two by two a plurality of slots open towards the inside of the stator body;

b) positioning a first inner ring 341 on the end face 135 of the stator body which adjoins the connecting parts 19 of the conductor segments 16, said first inner ring 341 having a cylindrical shape, being arranged radially to the exterior of the connecting parts 19, and being provided with assembly tabs 39 formed radially projecting from an inner peripheral face of the first inner ring 341, each of said assembly tabs 39 being intended to be inserted into an intermediate space between two adjacent conductor segments 16;

c) inserting a plurality of U-shaped conductor segments 16 inside the slots of the stator body, each conductor segment 16 comprising a pair of straight portions extending parallel to an axial direction X defined by the stator body and a connecting part 19 with a twisted profile connecting said straight parts, each conductor segment 16, once inserted into the stator body, having two free ends protruding axially from the end face 134 of the stator body which is opposite to that adjoining the connecting part, each of said assembly tabs 39 being inserted into an intermediate space between two adjacent conductor segments 16;

d) fixing a second inner ring 341 on the end face 134 of the stator body which adjoins the free ends of the conductor segments 16, said second inner ring 341 having a cylindrical shape and being arranged radially outside the free ends, the fixing taking place by means of assembly tabs 39 formed radially projecting from an inner peripheral face of the second inner ring 341, each of said assembly tabs 39 being inserted into an intermediate space between two adjacent conductor segments 16;

e) deforming the free ends of each conductor segment 16 so as to come into contact with a free end of another conductor segment 16 and securing, for example by welding, the two free ends thus brought into contact so as to form connecting parts 19;

f) possible deposing a layer of electrically insulating material on the connecting parts 19 initially present on the conductor segments 16;

g) possible deposing a layer of electrically insulating material on the connecting parts 19 formed in step e);

h) fixing, in particular by clipping, of a first outer ring 342 on the first inner ring 341, said first outer ring 342 having an annular rim 343 arranged axially facing the connecting parts 19 initially present on the conductor segments 16 and a cylindrical skirt 344 arranged radially inside said connecting parts 19, the first inner and outer rings 341, 342 together forming a first circulation tunnel for a cooling fluid;

i) fixing, in particular by clipping, a second outer ring 342 on the second inner ring 341, said second outer ring 342 having an annular rim 343 arranged axially facing the connecting parts 19 formed in step e) and a cylindrical skirt 344 arranged radially inside said connecting parts 19, the second inner and outer rings 341, 342 together forming a second circulation tunnel for a cooling fluid.

According to a second embodiment, the stator 13 provided with the front and rear covers 34, 35 can also be obtained by implementing the following successive operations:

a') providing a stator body 13 forming a crown, whose inner face is provided with teeth delimiting two by two a plurality of slots open towards the interior of the stator body 13;

b') inserting a plurality of U-shaped conductor segments 16 inside the slots of the stator body 13, each conductor segment 16 comprising a pair of straight parts extending parallel to a defined axial direction X by the stator body 13 and a connecting part with a twisted profile connecting said straight parts, each conductor segment 16, once inserted into the body of the stator 13, having two free ends protruding axially from the end face 134 of the body stator 13 which is opposite to that 135 adjoining the connecting part;

c') deforming the free ends of each conductor segment 16 so as to come into contact with a free end of another conductor segment 16 and securing, for example by welding, the two free ends thus brought into contact in a manner forming connecting parts 19;

d') possible deposing a layer of electrically insulating material on the connecting parts 19 initially present on the conductor segments 16;

e') possible deposing a layer of electrically insulating material on the connecting parts 19 formed during the deformation and the securing of the free ends of the conductor segments 16;

f) fixing a first inner ring 341 on the end face 135 of the stator body 13 which adjoins the connecting parts 19 of the conductor segments 16 initially present on the conductor segments 16, said first inner ring 341 being formed of two or more parts 341a, 341b, having a cylindrical shape and being disposed radially outside of said connecting parts 19, the fixing taking place by means of assembly tabs 39 formed radially projecting from an inner peripheral face of the first inner ring 341, each of said assembly tabs 39 being inserted into an intermediate space between two adjacent conductor segments 16;

g') fixing, in particular by clipping, a first outer ring 342 on the first inner ring 341, said first outer ring 342 having an annular rim 343 arranged axially facing the connecting parts initially present on the conductor segments 16 and a cylindrical skirt 344 arranged radially inside said connecting parts 19, the first inner and outer rings 341, 342 together forming a first circulation tunnel for a cooling fluid;

h') fixing a second inner ring 341 on the end face 134 of the stator body 13 which adjoins the connecting parts 19 formed in step c'), said second inner ring 341 being formed of two or more parts 341a, 341b, having a cylindrical shape and being disposed radially outside of said connecting parts 19, the fixing taking place by means of assembly tabs 39 formed radially projecting from an inner peripheral face of the second inner ring 341, each of said assembly tabs 39 being inserted into an intermediate space between two adjacent conductor segments 16;

i') fixing, in particular by clipping, a second outer ring 342 on the second inner ring 341, said second outer ring 342 having an annular rim 343 disposed axially facing the connecting parts 19 formed in step c') and a cylindrical skirt 344 arranged radially inside said connecting parts 19, the second inner and outer rings 341, 342 together forming a second circulation tunnel for a cooling fluid.

This second embodiment is particularly interesting by the fact that a finished stator (already wound) can be equipped with these cooling tunnels intended to cool the winding heads of the stator.

The disclosure is obviously not limited to the configuration of the disclosure as described above.

The invention claimed is:

1. An electric motor comprising
a rotor mounted on a shaft,
a stator arranged around the rotor,
a front bearing and a rear bearing connected to each other,
said front and rear bearings forming an inner cavity in which the rotor and the stator are housed,
the electric motor being cooled by a cooling fluid circulating in the inner cavity by being in contact with winding heads projecting axially from two end faces of the stator, respectively a front end face and a rear end face,
said cooling fluid entering the inner cavity through at least one fluid inlet channel and exiting the inner cavity through at least one fluid outlet channel,
wherein the motor further comprises two covers, respectively a front cover and a rear cover, of annular shape, the front cover, respectively rear, covering the winding heads protruding from the front, respectively rear end face of the stator and being configured to form a front, respectively rear, circulation tunnel for the cooling fluid, said front and rear circulation tunnels being in fluid communication with said at least one fluid inlet channel and said at least one fluid outlet channel,
wherein each of the covers is fixed in a detachable manner to the stator by means of at least two assembly tabs formed radially projecting from an inner peripheral face of each of the covers, each of said assembly tabs being configured to be inserted into an intermediate space between two circumferentially adjacent winding heads; and
wherein at least one of the assembly tabs incorporates a sensor of temperature.

2. The motor according to claim 1, wherein the assembly tabs are in the form of an inverted L, whose length is perpendicular to an axis defined by the shaft of the rotor is centered on said axis.

3. The motor according to claim 1, wherein each of the assembly tabs has a shape complementary to that of an intermediate space between two circumferentially adjacent winding heads.

4. The motor according to claim 1, wherein each of the front and rear covers is formed of an inner ring of a cylindrical shape, arranged radially outside the winding heads, and an outer ring fixed to the inner ring, said outer ring having an annular rim arranged axially facing the winding heads and a cylindrical skirt (344) arranged radially inside the winding heads.

5. The motor according to claim 4, wherein the inner and outer rings are connected together by clipping or by gluing.

6. The motor according to claim 4, wherein the inner ring is provided with a fluid inlet opening, which is in fluid communication with said at least one fluid inlet channel.

7. The motor according to claim 4, wherein the inner ring is provided with a fluid outlet opening, onto which said at least one fluid outlet channel opens.

8. The motor according to claim 4, wherein the inner ring is formed by the assembly of two or more parts connected together, the assembly of these parts being made during the clipping of the inner ring on the outer ring.

9. The motor according to claim 4, wherein the outer ring is formed by the assembly of two or more parts connected together, the assembly of these parts being carried out during the clipping of the inner ring on the outer ring.

10. The motor according to claim 4, wherein the outer diameter of the inner ring is slightly smaller than the outer diameter of the stator.

11. The motor according to claim 4, wherein the inner diameter of the outer ring is slightly greater than the inner diameter of the stator.

12. The motor according to claim 1, wherein said at least one fluid outlet channel comprises at least one outlet orifice formed radially through a cylindrical wall of one of the front or rear bearings adjoining an outer peripheral wall of the stator.

13. The motor according to claim 1, wherein said at least one fluid inlet channel comprises at least one inlet orifice formed radially through a cylindrical wall of one of the front or rear bearings adjoining an outer peripheral wall of the stator, said at least one inlet orifice fluidically communicating with at least one fluid circulation channel formed inside the stator, said at least one fluid circulation channel opening at one of its ends into a front intermediate space axially separating the front bearing of the stator and being in fluid communication with the front circulation tunnel and at another of its ends in a rear intermediate space axially separating the rear bearing from the stator being in fluid communication with the rear circulation tunnel.

14. The motor according to claim 1, wherein one of the front or rear bearings is equipped on its outer periphery with at least one fluid inlet pipe fluidly communicating with said at least one fluid inlet channel and/or at least one fluid outlet pipe fluidly communicating with said at least one fluid outlet channel.

15. The motor according to claim 1, wherein the sensor is arranged on said at least one assembly tab so as to be positioned in contact with the stator, and at the contact of a conductor segment of the stator.

16. The motor according to claim 1, wherein the cooling fluid is selected from air or an oil.

17. A method for manufacturing a stator for an electric motor according to claim 1, comprising the following steps:
providing a stator body forming a crown, whose inner face is provided with teeth delimiting two by two a plurality of slots open towards the inside of the stator body;
positioning a first inner ring on the end face of the stator body which adjoins the connecting parts of the conductor segments, said first inner ring having a cylindrical shape, being arranged radially outside the connecting parts, and being provided with assembly tabs formed radially projecting from an inner peripheral face of the first inner ring, each of said assembly tabs being intended to be inserted into an intermediate space between two adjacent conductor segments;
inserting a plurality of U-shaped conductor segments inside the slots of the stator body, each conductor segment comprising a pair of straight parts extending parallel to an axial direction defined by the stator body and a twisted profile connecting part connecting said straight parts, each conductor segment, when inserted into the stator body, having two free ends protruding axially from the end face of the stator body which is opposite to that adjoining the connecting part, each of the assembly tabs of the first inner race being inserted into an intermediate space between two adjacent conductor segments;

fixing a second inner ring on the end face of the stator body which adjoins the free ends of the conductor segments, said second inner ring having a cylindrical shape and being arranged radially outside the free ends, the fixing operating by means of assembly tabs formed radially projecting from an inner peripheral face of the second inner ring, each of said assembly tabs which is inserted into an intermediate space between two adjacent conductor segments;

deforming the free ends of each conductor segment so as to come into contact with a free end of another conductor segment and securing by welding, the two free ends thus brought into contact so as to form connecting parts;

possible deposing a layer of electrically insulating material on the connecting parts initially present on the conductor segments;

possible deposing a layer of electrically insulating material on the connecting parts formed during the deformation and the securing of the free ends of the conductor segments;

fixing, by clipping, a first outer ring on the first inner ring, said first outer ring having an annular rim arranged axially facing the connecting parts initially present on the conductor segments and a cylindrical skirt arranged radially inside said connecting parts, the first inner and outer rings together forming a first circulation tunnel for a cooling fluid;

fixing, by clipping, a second outer ring on the second inner ring, said second outer ring having an annular rim arranged axially facing the connecting parts formed during the deformation and the securing of the free ends of the conductor segments and a cylindrical skirt arranged radially inside said connecting parts, the second inner and outer rings forming together a second circulation tunnel for a cooling fluid.

18. The method for manufacturing a stator for an electric motor according to claim 1, comprising the following steps:

providing a stator body forming a crown, whose inner face is provided with teeth delimiting two by two a plurality of slots open towards the inside of the stator body;

inserting a plurality of U-shaped conductor segments inside the slots of the stator body, each conductor segment comprising a pair of straight parts extending parallel to an axial direction defined by the stator body and a twisted profile connecting part connecting said straight parts, each conductor segment, when inserted into the stator body, having two free ends protruding axially from the end face of the stator body which is opposite to that adjoining the connecting part;

deforming the free ends of each conductor segment so as to come into contact with a free end of another conductor segment and securing by welding, the two free ends thus brought into contact so as to form connecting parts;

possible deposing a layer of electrically insulating material on the connecting parts initially present on the conductor segments;

possible deposing a layer of electrically insulating material on the connecting parts formed during the deformation and the securing of the free ends of the conductor segments;

fixing a first inner ring on the end face of the stator body which adjoins the connecting parts of the conductor segments initially present on the conductor segments, said first inner ring being formed of two or more parts, having a cylindrical shape and being arranged radially outside of said connecting parts, the fixing operating by means of assembly tabs formed radially projecting from an inner peripheral face of the first inner ring, each of said assembly tabs being inserted into an intermediate space between two adjacent conductor segments;

fixing by clipping, a first outer ring on the first inner ring, said first outer ring having an annular rim arranged axially facing the connecting parts initially present on the conductor segments and a cylindrical skirt disposed radially inside said connecting parts, the first inner and outer rings together forming a first circulation tunnel for a cooling fluid:

fixing of a second inner ring on the end face of the stator body which adjoins the connecting parts formed during the deformation and the securing of the free ends of the conductor segments, said second inner ring being formed of two or more parts, having a cylindrical shape and being arranged radially outside of said connecting parts, the fixing operating by means of assembly tabs formed radially projecting from an inner peripheral face of the second inner ring, each of said assembly tabs being inserted into an intermediate space between two adjacent conductor segments;

fixing by clipping, a second outer ring on the second inner ring, said second outer ring having an annular rim arranged axially facing the connecting parts formed during the deformation and the securing of the free ends of the conductor segments and a cylindrical skirt arranged radially inside said connecting parts, the second inner and outer rings forming together a second circulation tunnel for a cooling fluid.

* * * * *